United States Patent [19]
Wyden

[11] 4,217,124
[45] Aug. 12, 1980

[54] METHOD OF FORMING CONOID SURFACES

[76] Inventor: Stephen Wyden, Box 144, Esperance, N.Y. 12066

[21] Appl. No.: 747,599

[22] Filed: Dec. 6, 1976

Related U.S. Application Data

[63] Continuation-in-part of Ser. No. 425,901, Dec. 18, 1973, Pat. No. 4,010,020.

[51] Int. Cl.$^2$ ............................................. C03B 19/04
[52] U.S. Cl. .......................................... 65/71; 65/302; 264/298; 264/311
[58] Field of Search ............... 65/71, 302; 264/1, 298, 264/311

[56] References Cited

U.S. PATENT DOCUMENTS

| | | | |
|---|---|---|---|
| 793,299 | 6/1905 | Jewett | 65/71 |
| 2,972,782 | 2/1961 | Archibald | 264/311 |
| 3,691,263 | 9/1972 | Stoy et al. | 264/1 |
| 3,838,964 | 10/1974 | Hake | 65/302 |

Primary Examiner—Arthur D. Kellogg

[57] ABSTRACT

Conoid surfaces can be generated by rotation of a material at different angles and under differing constraints. An axis of 45° can produce hyperboloids; with perpendicular axes, concentric spheres can be produced; magnetic fields can be used to shape the lenses; and multielement lenses can be produced with special chambers.

19 Claims, 5 Drawing Figures

METHOD OF FORMING CONOID SURFACES

This application is a continuation-in-part of the co-pending application Ser. No. 425,901, filed on Dec. 18, 1973, now U.S. Pat. No. 4,010,020 and is entitled to the earliest filing date for common subject matter.

This application concerns methods of producing lenses of which much is known. Curved surfaces of revolution have been produced by grinding, spinning, and by application of unequal pressures to the surface. This application concerns processes of generating curvatures in one or more surfaces of a material wherein at least one of the steps involves spinning and through which process the type and degree of curvature of the surface is under the control of the operator.

Spinning, as a means of modifying a mass of molten material previous to and during congealing to a solid is well known in the art, and has been used to fill molds effectively, to order the distribution of the molecules of a mass or object, and to generate paraboloid surfaces. Methods of spinning are known that use one axis and those that use a plurality of axes: wherein the axes intersect, within, or without the rotating mass. However, the prior art in spinning optical surfaces restricts the flow to two conditions: Only one critical surface is generated or intended for use. Only paraboloid surfaces are made.

My apparatus is not restricted to paraboloid surfaces and may produce more than one optical surface on a material. Further, in one embodiment, the material to be formed does not, itself, rotate. Coatings can be deposited on intermediate surfaces in my invention.

In another embodiment of my invention, differential pressure on a membrane can be employed as part of the means to form the surface. The nature of the fluid materials making direct contact has not been explored for its effects on the surfaces generated. This invention points out the importance of the relative viscosities of the materials. Finally, finishing procedures could be carried out in the same vessel in which the reaction takes place, as for example, inserting an abrasive slurry between the surfaces generated.

The theoretical basis for my invention can best be described by considering the geometry of three basic curves—the parabola, the hyperbola, and the circle. In spinning, the formation of a parabola is due to the interaction of centrifugal and gravitational forces. While the general equation of the parabola is $$Y = aX^2 + bX + C \tag{1}$$

the parabola is generated in spinning by the equation:

$$G = F \times C \tag{2}$$

Where G is the gravitational attraction, F is the centrifugal force and C is a constant including the density of the material spun.

The hyperbola is generated mathematically by several equations including:

$$XY = C \tag{3}$$

This can be achieved in spinning by rotating the axis of rotation to a 45° angle. Under these conditions the centrifugal force, F, can be divided into two vectors Fx and Fy, the respective vertical and horizontal components of the centrifugal force. Rewriting the general equation and substituting we have:

$$Y = C/X \text{ and} \tag{4}$$

$$Fx = C/Fy \tag{5}$$

In equation 5, the term Fx will be equal to the horizontal vector component of the centrifugal force and term Fy will refer to the corresponding vertical forces, the actual vertical vector component of the centrifugal force (fy) minus the constant force of gravity (g):

$$Fy = fy - g \tag{6}$$

Thus, in the physical embodiment of the hyperbola, if the distances of the surface from the axes are generated by the forces due to spinning, the curve generated by equation (5) will be that of a hyperbola which means that the difference between the distances (or forces) to the foci from any point will be constant.

The third general case of a family of curves of importance is the circle and the sphere, one of its three dimensional analogs. When a vessel is simultaneously rotated around two axes that are perpendicular to each other and, preferably, both are at a 45° angle to the vertical, while the foci in the concave faces of the curves coincide, the resultant curve is a sphere. The angle with the vertical is not critical and elipsoids can also be generated by varying the focal lengths. The cuves formed result from the vectors of the forces generated. They can be mathematically derived from the preceeding discussion.

Several familiar shapes can be used as reaction vessels including cylinders; cones, single or double with base to base; and spheres.

Figure 4:
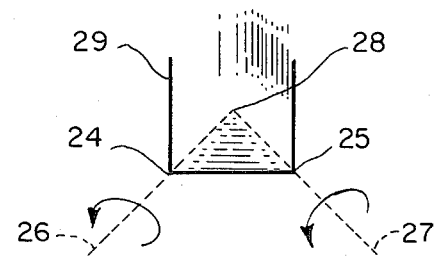

FIG. 4 illustrates a special vessel designed to form a spherical surface under special conditions and is composed of a cylindrical upper section and a specially curved base.

Figure 5:
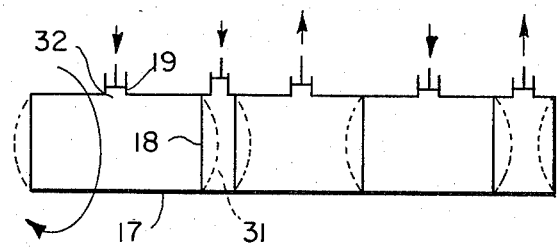

FIG. 5 represents a modified cylinder designed to contain several elements which can be shaped, preliminarily, by variations in pressures on the membranes separating the elements.

DETAILED DESCRIPTION OF THE DRAWINGS

Figure 1:
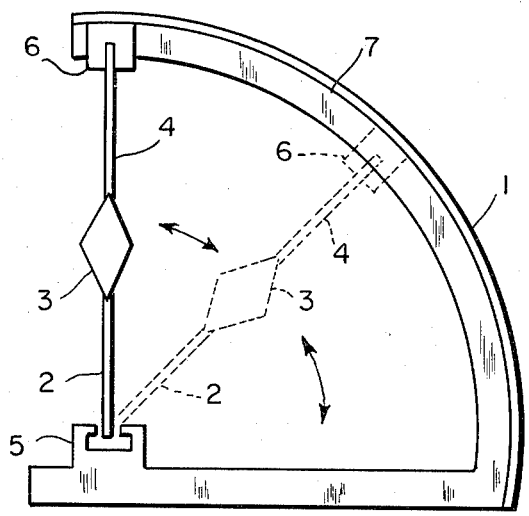
FIG. 1 is an embodiment of my invention having one axis of rotation in which the angle of rotation is adjustable.

FIG. 1 comprises a support frame (1) on which is mounted a supporting member (2) anchoring the reaction vessel (3) which is suspended by another supporting member (4) which is attached to the frame (1). In as much as material can be spun faster if it is off-center, but the axis should not be off-center for accuracy of the surfaces formed, centering and eccentricity are controlled at the base of the lower support member (5). At the top of the upper support member (6) a means is provided for driving and control of eccentricity. The term eccentricity refers to the distance of displacement of the axis of the vessel from the nominal axis of rotation. The driving means could use gears or belts driven off a motor that need not be directly attached to the apparatus. In fact, if the motor is mounted separately and drives through a coaxial cable, its vibrations will cause minimal distortion of the surfaces formed. The angle of the reaction vessel's axis of rotation is determined by the position of the upper control (6) on the track (7) in the frame. When the supporting members (2) and (4) hold the reaction chamber in the vertical position paraboloid lenses will be formed by rotation. Several surfaces can be formed either sequentially, after solidification of each layer, or by use of several immiscible layers. In the same manner, when the reaction vessel (3) and support members (2) and (4) are at a 45° angle, hyperboloid surfaces can be formed in the same manner. A conic reaction vessel (3) is best for hyperboloid surface formation while a cylindrical chamber for the reaction vessel (3) would be best for paraboloid lenses.

Figure 2:
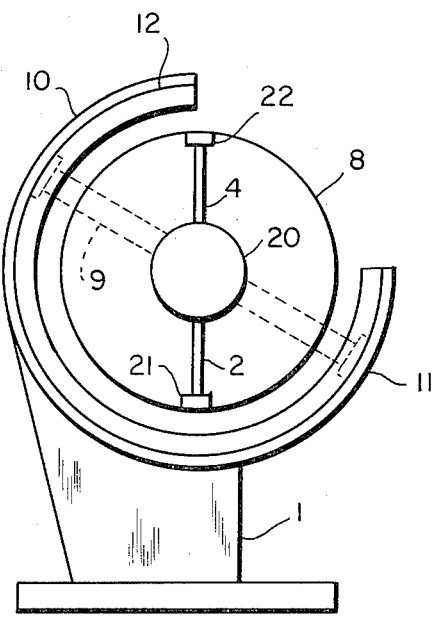
FIG. 2 is a modification of FIG. 1. In this embodiment two axes of rotation, each of which is adjustable, are employed.
Figure 3:
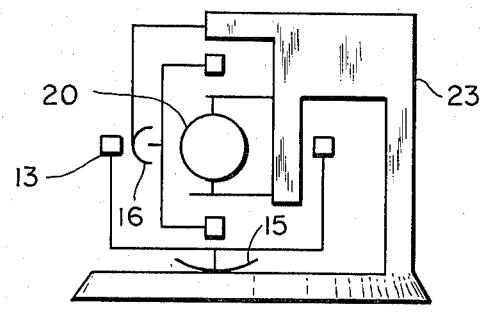
FIG. 3 is an embodiment of my invention which employs magnets as the spinning force when the material being spun is responsive to a magnetic field.

FIG. 2 comprises a support frame (1), support members (2), (4) supporting a reaction vessel (20) and having eccentricity control and centerable driving means (22). The driving means (22) and eccentricity control (21) and support members (2) and (4) are mounted on circular frame (8) which in turn is mounted on a frame (9) which is eccentrically controlled (10) and rotated by a centerable driving means (11) and mounted on the support frame (1), while being rotatable on a track of circular curvature (12). When the frame (9) is at a 45° angle and support members (2) and (4) are at a 45° angle, and perpendicular to frame (9), their axes intersecting at their midpoints within the reaction vessel, material in the reaction vessel can be rotated on two axes simultaneously. If the rotations are equal, a shpere will be formed, if the rotations are unequal, an ellipsoid will form. FIG. 3 shows an apparatus including a stationary reaction vessel (20) of spherical shape rigidly attached to the frame (23) and a plurality of rotating magnets, in FIG. 3 comprising of a pair of horizontally rotating magnets (13) and a pair of vertically rotating magnets (14). The horizontal pair (13) of magnets is attached to a circuular section track (15 on which the magnets rotate. Means are attached between the magnets (13) and the track (15) to rotate the magnets about the vessel (20) and to move the magnets (13) along the track (15) so that the plane of rotation may be shifted toward the vertical. The vertical pair of magnets (14) is attached to a circular section track (16) on which it rotates. Means are attached between the magnets (14) and the track (16) to rotate the magnets about the vessel (20) and to move the magnets (14) along the track (16) so that the plane of rotation may be shifted towards the horizontal. The track (15) and (16) are attached to the frame (23).

FIG. 4 is a vessel, designed to minimize turbulence in rotations involving a plurality of axis, formed by the confluence of two cones, each of an apex angle of at least 90°, (24) and (25), the midlines to the apices, (26) and (27), intersecting within the described vessel at a 90° angle and at a point which is along the vertical midline of the vessel (28), the sides rising to form a vertical section (29) of circular cross section. This vessel is designed to form a spheroid surface by generating two hyperboloids at 90° from each other, within a surface, and each at 45° from the vertical, with a different focal points and the point of intersection of the axis of rotation coinciding.

FIG. 5 comprises a cylinder of rigid housing (17) divided into compartments (30) or elements by a set of flexible membranes (18), the individual element comprising a section of the housing with at least one side open, the opening closed by a flexible membrane, usually thin, stretched across the circumference of the opening, the membrane itself either flexible metal or elastic or plastic material, either opaque, translucent, or, especially if it is to remain as part of the product, transparent, with or without a reflective or anti-reflective coating, each compartment having a piston controlled pressure regulating port (19). When the pressures have been properly adjusted in each element, the unit can be inserted in a spinning apparatus to further modify the elements. The membranes (18) can respond to the spinning by stretching in the direction dictated by the forces produced (31). If the cylinder is of known volume and the parts are of known, uniform, diameter, the shape of the elements (31) can in part be monitored by the size of the port plug (32) while the plug also serves as a permanent guide in the finished product to the original settings.

DETAILED DESCRIPTION OF THE INVENTION

In the light of my drawings, what I have invented is a new apparatus and method for the spinning of one or more curves surfaces on a fluid material, wherein the type of curve and its exact curvature are under the control of the operator.

Thermoplastic materials, including glasses, or themosetting materials having suitable working temperature ranges may be used, depending on the heat control device used. The reaction vessel (3) would be filled with the material to be formed, usually one or more immiscible liquids, usually completely filling the chamber, and then the chamber would be sealed. The eccentricity would be set at a high value. The rotation would begin and slowly build up. The eccentricity would be reduced as the rotation increased until at the desired rate of revolution, the eccentricity would be reduced to the desired, minimal value. This stabilized environment is maintained while the material in the reaction vessel is being modified to the desiged degree, probably including solidification of part or all the material from its original, molten state.

While air has been used as the non-solidifying fluid in prior art, it has been found that materials of greater viscosity tend to dampen the turbulence found in spinning processes and therefore produce surfaces with minimal distortion. For the purpose of surface formation, the contiguous layers should be immiscible, of slightly different densities and, where a layer is not intended to be retained, should have solidification conditions outside the operating range. An elastic membrane may be employed if mounted to conform to the boundary conditions of the surface to be formed on its surface.

Coatings may be applied to the surfaces of the various layers, if two or more adjacent layers are organic or inorganic electrolytes, or if the proper chemical reactions can occur in a layer or adjacent layers. During formation of the elements, the coatings may be formed before or after the solidificatin of one or more of the layers, depending on the necessary chemistry. Alternatively, if a membrane is used, a surface of the membrane can be pre-coated: as is know in the art. The rotation can be stopped and the reaction vessel opened and the contents removed. Further modifications of the product may be carried out after inspection of same, such as deposition of additional layers.

After formation of the material, possible roughnesses in the formed surface may be eliminated by introducing an abrasive slurry of some known composition between the surfaces of the materials in the reaction vessel or its equivalent, permitting the adjacent surfaces to abrade each other by the rotation of either or both of the surfaces and/or by the rotation of the reaction vessel or equivalent.

The specific curve types formable under these conditions include paraboloid, hyperboloid, and spheric sections. In FIG. 1, with support members (2) and (4) in the vertical position, rotation of the reaction vessel (3) about its axis will generate a paraboloid, as is known. Tilt the angles of the axis to 45° as in the phantom of FIG. 1, and you can generate hyperboloid surfaces. The use of two axes of rotation permits the formation of spheric surfaces as in FIG. 2, where direct rotation of the support members (2) and (4) within a circular frame (8) is combined with rotation of the circular frame (8) by the rotatable frame (9) which is mounted on a fixed, supporting frame (1). The rotaton about the axis formed by support members (2) and (4) will drive the fluid and therefore the fluid surface away from the axis and up along the opposite wall of the reaction chamber. The rotation of frame (9) will drive the fluid and therefore the fluid surface away from the axis of rotation (Frame (9) and up along the wall opposite this axis. The material will thereby be distributed in two planes at once and will respond to the combined forces.

If the forces are of equal magnitude and perpendicualar to one another, the forces will tend to form a spherical surface.

Several modifications are envisioned in the operation of my invention. The means of rotating the fluid material in the reaction vessel could be a rotating external field to which the material to be rotated is responsive; for example, a magnetic field. FIG. 3 shows two pairs of magnets, (13) and (14) rotatable on axes which may be prependicular to one another.

The reaction vessel can take several shapes, A cylindrical vessel (see FIG. 5) is known to be good for generating paraboloids. In the light of the assytotic character of hyperboloids, a conic vessel would be good for generating hyperboloids, either a single conic section or two cones with contiguous bases, as illustrated in the reaction vessel (3) of FIG. 1.

Spheric surfaces can be generated in spheres (see the reaction vessel (3) in FIG. 2). Spheric sections can also be generated in a vessel illustrated in FIG. 4 wherein the base is a pair of cones overlapping and rising to form a cylinder. In such a vessel spheric surfaces could be formed and paraboloid and hyperboloid surfaces could be formed above such surfaces, after the solidification of the material forming the spheric surface.

A pretreatment is possible in forming compound lenses requiring a plurality of elements, where membranes are used in forming the boundaries between elements. Ports (19) may be fitted to each element, the port having a piston whose movement can change the relative curvature of the various surfaces (18) by changing the volume and pressure in each particular element. The modified series of elements with the various pistons in the ports locked stationary can then be rotated.

A specific embodiment of my invention could follow the form of FIG. 2. A rigid support frame (1) forms a circular track (12) on which a frame (9) is mounted at (10) and (11) with bearings and a locking device so that it won't slip after being positioned. The frame (9) can be centered on the driving axis between (10) and (11) by the eccentricity control (10) and the centerable driving means (11). The simplest form of centering would be a set of stops on the mounts (10) and (11), one dead center and the others off center. A circular frame (8) is rigidly attached to the frame (9). Support members (2) and (4) are attached to frame (8) at driving means (6) and eccentricity control (5) in the same manner that eccentricity control (10) and centerable driving means (11) connect Frame (9). Reaction vessel (3) connected to support members (2) and (4) and nested at the dynamic center of the apparatus could be filled with several immiscible layers (in this embodiment 3 immiscible liquids). If the densest layer has the lowest melting point, the second layer has a higher melting point and the last layer of lowest density has the highest melting point, then an element can be formed of one, two or three layers: Rotation at temperatures above the melting point of the layer of highest melting point would prevent solidification. As the temperature falls, the center, middle, and finally outer most layer would solidify. The temperature at which the work is removed would determine the number of layers and the nature of the rotation at the different temperature ranges will determine the curvature of each layer.

The compartmented reaction vessel illustrated in FIG. 5, operates as follows: All the chambers of the reaction vessel (17) are filled so that the flexible membranes (18) are flat and the pistons in the ports (19) are uniformly positioned. By moving the pistons, the shape of the membranes is changed. Pushing in on the piston in the first port (19) causes its two flexible membranes (18) to distend outward (dashed lines), pressure on the next piston causes its distal membrane to bulge outward, pulling on the piston in the third chamber draws the two flexible membranes of this compartment inward, pressure on the piston in the fourth port drives its flexible membranes outward and the vacuum in the fifth chamber due to pulling on the piston in the fifth port draws the flexible membranes of the last chamber inward.

It is to be understood that the above described apparatus for and method of making lenses and lenses made thereby are illustrative of the principles of the invention. Other such arrangements can be devised by one skilled in the art without departing from the spirit and scope of the invention. For example: compound lenses composed of several elements could be formed by forming the various layers one at a time, rather than all at once; thereby, the particular conoid surfaces of each layer could be varied, one from another. Also, the avialability of refractory lenses containing multiple paraboloid and hyperboloid surfaces shall expand the realm of the lens makers art, the availability of spheres of known curvature and composed of several spheres one contained within another, likewise shall extend the lens makers art. The use of this invention in non-optical fields such as forming of magnetic fields, will be apparent to those skilled in the art, also.

What I claim is:

1. A method of making curved surfaces which comprises:
    filling a reaction vessel with a plurality of materials,
        forming a plurality of layers, a portion of which
        will solidify under the operating conditions; making an adjustment for the rotation of the vessel, including initially off-setting the axis of rotation to an eccentric position to initiate rotation and then reducing the eccentricity to minimize turbulence at the desired rate of revolution;

rotating said material until a desired curvature is formed on the surfaces of the portion of the material to be solidified; adjusting the conditions to cause solidification as the rotation continues, and stopping the rotation, after sufficient solidification, and removal of the formed material.

2. In the method of claim 1, wherein, after stopping the rotation, material to form subsequent layers is provided and rotation is resumed in accordance with the method claimed, at a particular angle of rotation and spped of rotation until the subsequent layers have solidified, whereby a lens may be formed of a plurality of layers and a plurality of types of curvatures.

3. The method of claim 1, in the reaction vessel, the use of elastic membranes to separate the different layers, mounted to conform to the boundaries of the surfaces to be formed.

4. In the method of claim 1, the use of a flexible membrane to separate a pair of adjacent layers of materials, one of the pair of adjacent layers to be solidified, a surface coating applied to a surface of the flexible membrane before use of the flexible membrane between the adjacent layers of material.

5. The method of claim 1, wherein a coating is formed between a pair of adjacent layers of materials, one of the pair of adjacent layers to be solidified, the coating formed at a boundary between the adjacent layers of material by electrodeposition.

6. The method of claim 1, further comprising:
forming a coating at a boundary between adjacent layers of the material by electrodeposition, one of the adjacent layers to be solidified.

7. The method of claim 6, wherein the electrodeposition is applied during the rotation of the adjacent layers of materials.

8. The method of claim 6, wherein the electrodeposition is applied after the rotation of the adjacent layers of materials.

9. The method of claim 1, wherein a coating is formed between a pair of adjacent layers of materials, one of the pair of adjacent layers to be solidified, the coating formed at a boundary between the adjacent layers of material by a chemical reaction.

10. The method of claim 1, wherein the adjustment of the axis of rotation is is a tilting of the axis of rotation to an angle of approximately 45°, whereby a hyperboloid surface may be formed.

11. The method of claim 1, wherein the adjustment of the axis of rotation is a tilting of the axis of rotation to an angle of approximately 90°, the axis of rotation connected to an additional axis of rotation, the additional axis of rotation being for rotation of the reaction vessel attached to the axis of rotation, the additional axis of rotation tilted to a horizontal angle, whereby a spherical or ellipsoid surface can be generated.

12. The method of claim 1, further compising:
forming a coating at a boundary between adjacent layers of the material by a chemical reaction, one of the adjacent layers to be solidified.

13. A method for generating curved surfaces without mechanical rotation of the material to form the surfaces because at least part of the material is responsive to an external field, comprising:

filling a reaction vessel with fluid material, which can, at least in part, change from the fluid phase to the solid phase, and rotating said material by external rotation of a field to which the material is responsive, and means for removal of the material after a sufficient portion of the material has solidified under the influence of the rotating field.

14. The method of claim 13, wherein the rotating external field is magnetic.

15. A method of making curved surfaces which comprises:

filling a reaction vessel with a plurality of materials, forming a plurality of layers, a portion of which will solidify under the operating conditions; making an adjustment for the rotation of the vessel, adjusting the eccentricity of the axis of rotation to minimize turbulence at the desired rate of revolution, rotating said material until a desired curvature is formed on the surface of the portion of the material to be solidified;

adjusting the conditions to cause solidification as the rotation continues, stopping the rotation, after sufficient solidification;

providing material to form subsequent layers, resuming rotation in accordance with the method claimed, at a particular angle of rotation and speed of rotation until the subsequent layers have solidified, whereby a lens may be formed of a plurality of layers and a plurality of types of curvatures.

16. A method of making curved surfaces which comprises:

filling a reaction vessel with a plurality of materials, forming a plurality of layers, a portion of which will solidify under the operating conditions, separating the different layers by the use of an elastic membrane, the membrane mounted to conform to the boundaries of the surfaces to be formed; making an adjustment for the rotation of the vessel, adjusting the eccentricity of the axis of rotation to minimize turbulence at the desired rate of revolution;

rotating said material until a desired curvature is formed on the surfaces of the material to be solidified;

adjusting the conditions to cause solidification as the rotation continues, and stopping the rotation, after sufficient solidification, and removal of the formed material.

17. A method of making curved surfaces which comprises:

filling a reaction vessel with a plurality of materials, forming a plurality of layers, a portion of which will solidify under the operating conditions;

making an adjustment for the rotation of the vessel by a tilting of the axis of rotation to an angle of aproximately 45°, whereby a hyperboloid surface may be formed; adjusting the eccentricity of the axis of rotation to minimize turbulence at the desired rate of revolution; rotating said material until a desired curvature is formed on the surfaces of the portion of the material to be solidified;

adjusting the conditions to cause solidification as the rotation continues, and stopping the rotation, after sufficient solidification, and removal of the formed material.

18. A method of making curved surfaces which comprises:

filling a reaction vessel with a plurality of materials, forming a plurality of layers, a portion of which will solidify under the operating conditions, making an adjustment for the rotation of the vessel, the adjustment being a tilting of the axis of rotation to an angle of aproximately 90°, the axis of rotation connected to an additional axis of rotation, the additional axis of rotation being for rotation of the reaction vessel attached to the axis of rotation, the additional axis of rotation tilted to a horizontal angle, whereby a spherical or ellipsoid surface can be generated; adjusting the eccentricity of the axis of rotation to minimize turbulence at the desired rate of revolution;

rotating said material until a desired curvature is formed on the surfaces of the portion of the material to be solidified;

adjusting the conditions to cause solidification as the rotation continues, and stopping the rotation, after sufficient solidification, and removal of the formed material.

19. A method of making curved surfaces which comprises:

filling a reaction vesssel with a plurality of materials, forming a plurality of layers, a portion of which will solidify under the operating conditions; a flexible membrane having a surface coating applied to a surface of the flexible membrane mounted to conform to the boundaries of at least one of the surfaces to be formed, the membrane forming at least one of the surfaces formed under the operating conditions; making an adjustment for the rotation of the vessel, adjusting the eccentricity of the axis of rotation to minimize turbulence at the desired rate of revolution; rotating said material until a desired curvature is formed on the surfaces of the portion of the material to be solidified; adjusting the conditions to cause solidification as the rotation continues, and stopping the rotation, after sufficient solidification, and removal of the formed material and the attached coated flexible membrane.

* * * * *